Aug. 28, 1928.
C. MATLOCK
1,681,945
APPARATUS FOR PRODUCING CARBON
Original Filed Jan. 5, 1921
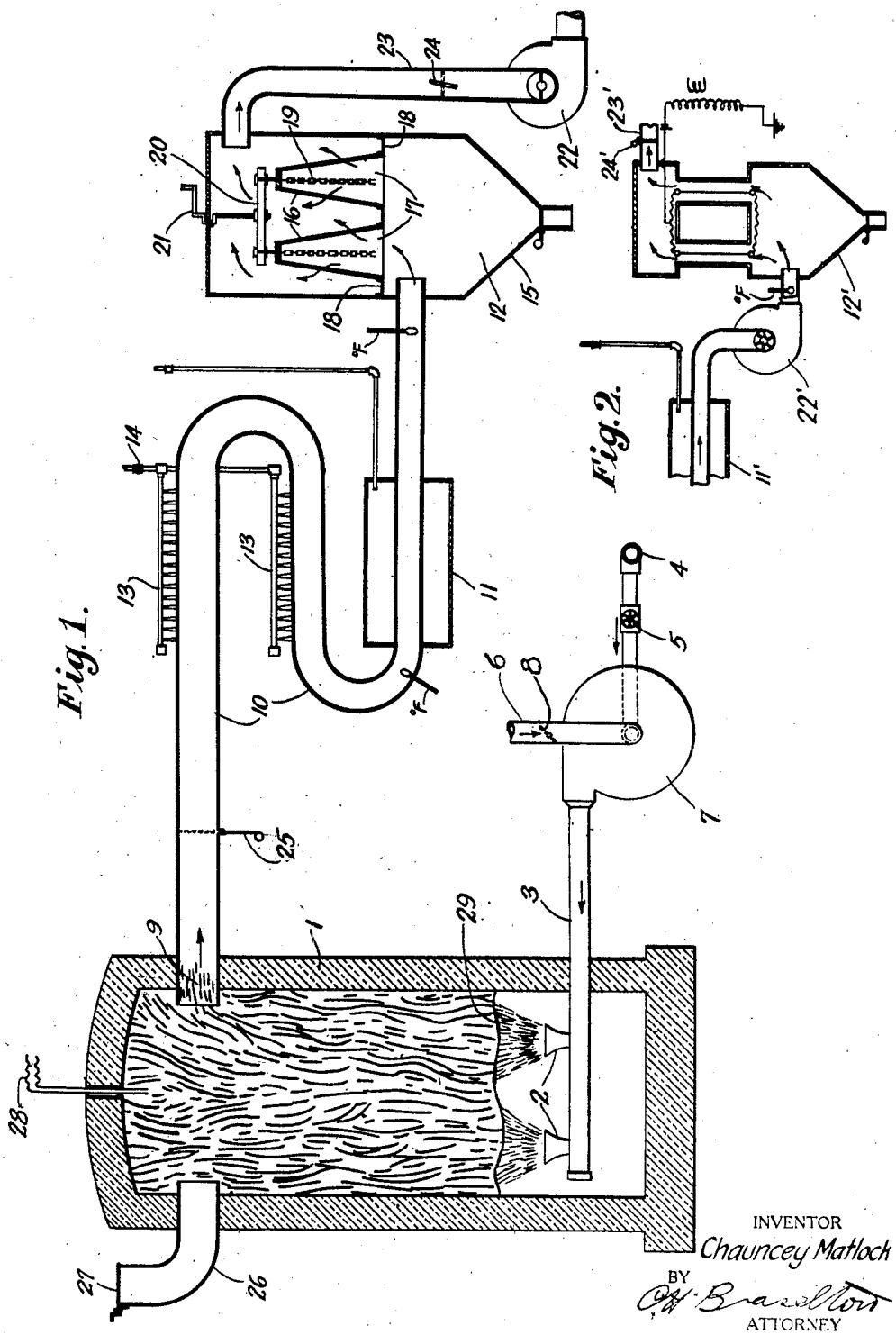

Patented Aug. 28, 1928.

1,681,945

UNITED STATES PATENT OFFICE.

CHAUNCEY MATLOCK, OF BROOKLYN, NEW YORK, ASSIGNOR TO MONROE-LOUISIANA CARBON COMPANY, OF MONROE, LOUISIANA, A CORPORATION OF DELAWARE.

APPARATUS FOR PRODUCING CARBON.

Original application filed January 5, 1921, Serial No. 435,071. Divided and this application filed June 11, 1923. Serial No. 644,722.

This invention relates to the disassociation of the constituents of hydrocarbons and particularly to the disassociation of a hydrocarbon gas and the collection and recovery of the elemental carbon therefrom.

The object of my invention generally is to obtain an improved quality of carbon black from a hydrocarbon gas, for example natural gas, and to recover a larger proportion of the carbon constituent per unit volume of gas than has hitherto been possible with many known methods and devices.

A further object of my invention is a method and an apparatus for producing carbon black whereby the cost of installation and operation of the plant are reduced to a minimum and the efficiency of production generally improved, the operation according to this method being continuous and nonintermittent.

This application is a division of my copending application, Serial Number 435,071, filed January 5, 1921, Patent Number 1,458,-351 which has been reissued into Reissue Number 16,765.

The method and apparatus generally used for producing carbon black on a commercial scale consists in partially burning the natural gas or other hydrocarbon gas by means of a multiplicity of miniature burners and causing the individual flames or products of combustion to play upon chilled surfaces whereon a portion of the carbon content is deposited and subsequently scraped off. The black thus obtained often contains metallic iron and scale and often contains other impurities and characteristics which render it unsuitable for certain of its uses. Moreover, the apparatus usually employed is crude and comparatively expensive to build and the collecting devices wear very rapidly, necessitating periodic replacements. Further, the usual commercial plants are cumbersome and occupy large areas.

Certain other methods have been suggested for the manufacture of carbon black, but none of them appear to have reached the practical or commercial stage of development.

According to my improvements I produce a carbon of an improved character which is peculiarly free from the above mentioned injurious constituents and undesirable characteristics, and moreover, I obtain larger quantities of carbon per unit volume of gas and in a more efficient and less expensive manner than is possible with known methods and devices.

Generally stated, my improvements reside in the continuous partial or incomplete combustion of the hydrocarbon gas in a comparatively large furnace by supplying to the furnace and to the gaseous flame predetermined quantities of air which are insufficient for complete combustion, and the passing of the resultant products of combustion through a suitable collector for isolating the liberated carbon therefrom.

I have found that the quality of the carbon and carbon yield are substantially improved by a careful and accurate adjustment of the mixture of air (oxygen containing agent) and gas supplied to the furnace, and particularly by the manner in which the mixture is accomplished. For example, the admission of the air into the furnace beneath the burners gives good results, particularly when the air is automatically supplied in regulated quantities and at predetermined pressures (preferably only slightly above atmospheric). I obtain excellent results by automatically mixing the gas and air according to predetermined proportions before the mixture reaches the flame zone and I prefer also to employ these methods and devices in connection with certain other of my improvements in the manufacture of carbon as will appear hereinafter.

In the practice of my invention I have devised a furnace with a battery of comparatively large burners or gas intakes with their mouths opening into the furnace at points a short distance from the bottom of the chamber. The hydrocarbon gas issuing from the gas intakes is caused to burn very slowly and lazily by supplying thereto predetermined quantities of air, but insufficient to reduce complete combustion, the gas being supplied at a pressure above atmosphere and the burning taking place at the desired pressure. Means are provided for regulating the pressure and the volume of the gas supplied to the burners and for automatically regulating and supplying the exact quantity of air required to the furnace. Preferably, this means consists of a rotary fan or blower, as good results have been obtained therewith. The resulting products of combustion and unburned gases are more or less confined or trapped in the furnace and the temperature thereof elevated to the desired degree for most efficient operation. Provision is made for the gradual exhaust of the resulting products and gases through a restricted outlet near the top of the furnace. The hot products with the liberated carbon are conducted from this outlet through a cooling system or circuit of restricted dimensions for reducing the temperature, increasing the density and reducing the volume and thence to a collector where the carbon is separated from the other constituents. The collector is preferably either of the electrical precipitation type or of the closed bag filtration type. A fan or blower together with an exhaust regulator is provided for the purpose of assisting to maintain the natural draft of the products of combustion and to impart thereto the required velocity through the restricted passages of the cooling system, as I find that the efficiency of operation and production is thereby increased. This fan may be dispensed with, however, in cases where the desired draft is otherwise obtained. The hot gases with the liberated carbon in suspension are drawn through the conduits at sufficient velocity to carry along therewith the greater portion of any flocculent carbon which may be precipitated in the cooling pipes, and substantially the whole of the liberated carbon which leaves the furnace with the gases is borne to the collector and thence recovered.

The advantages of my improved method and apparatus will more fully appear from the following detailed description and the accompanying drawings, the latter being diagrammatic illustrations of the system and apparatus according to certain modifications, wherein, Figure 1 is a diagrammatic drawing of a system embodying my improvements.

Figure 2 is an illustration of a modified form of collector.

Referring to these drawings, I have illustrated in section a furnace 1, this furnace being of large or generous dimensions as compared with certain of the other elements of the apparatus. There are provided a number of burners 2 (only two being illustrated) which are supplied with a hydrocarbon gas, for example natural gas, through a supply pipe 3 leading to a gas main 4. A valve 5 is indicated for controlling the gas circuit and preferably the circuit is provided with a gas pressure regulator (not illustrated) for the purpose of supplying gas at a substantially uniform and constant pressure. There is a rotary fan or blower 7 interposed in the supply pipe 3 which serves as a rotary mixing machine for the gas introduced through valve 5 and air introduced through pipe 6 at the center of the mixer, this fan or mixer serving also as a means for varying the pressure of the intermixed gases which are carried on through the supply pipe 3 to the burners 2 in predetermined proportions so that burning is effected in any desired way. The quantity of gas and air introduced into the mixer 7 is determined by the setting of the gas valve 5 and the air valve 8. It is noted that the burners are positioned near the base of the furnace so that the whole interior thereof is usable for the intermixing and combustion of the consumed and partially consumed gases and vapors but it is understood, however, that this arrangement may be varied in some respects without departing from the spirit of the invention.

Near the top of the furnace 1 there is provided a restricted outlet 9 which leads to a cooling circuit or system 10. From the cooling system 10 the furnace outlet leads through a heater 11 and from thence to a collector 12. The cooling system consists of a pipe of restricted dimensions as compared to the volume of the furnace and a water spray system 13 which may continuously spray cold water upon the cooling pipes 10 for the purpose of reducing the temperature of the products of combustion passing therethrough. The degree of cooling may be regulated by adjusting the supply of water to the spraying system as for instance by means of a valve 14 in the water main. The cooling pipes 10 are observed to slightly diminish in cross section from the front to the rearmost end. This reduction in cross section may be made because the products of combustion may be reduced in volume as they are cooled by contact with the cooling pipes. The resulting increase in density of the gases passing through the cooling and collector system promotes the efficient separation of the carbon from the other gases.

Two different types of collectors are illustrated, collector 12 being of the bag filtration type and collector 12′ (Fig. 2) being of the electrical precipitation type. The collector 12 consists generally of a container, preferably of cylindrical shape, with a hopper 15 on the lower part for collecting the carbon as it falls by gravity or is caused to fall from the filtration bags. The filtration bags are indicated diagrammatically at 16 whose open ends register with the openings 17 in the partition plate 18 carried by the container. The bags (only two of which are shown) may be carried in any suitable manner and means may be provided, if desired, for agitating or shaking the bags to loosen the carbon collected thereby. I have illustrated a novel chain arrangement for loosening the carbon, the chain 19 being suspended from the bar 20 and the whole being mounted upon a crank 21 whereby the chains may be given the necessary movement for contacting with and jostling the bags. The chains preferably are suspended to hang downwardly within the bags.

A blower or exhauster 22 is provided for assisting the natural draft of the system, the blower being connected with the upper part of the collector container through a conduit 23. There is disposed within this conduit a regulating valve 24 whereby the exhaust or draft pressure may be regulated or adjusted to a nicety.

The operation of the system may be described substantially as follows:

The natural gas having been turned on (at a pressure above that of the atmosphere), the burners are lighted and the air regulator 8 and blower 7 adjusted to supply positively the exact quantity of air and gas desired for the most efficient operation of the system and the products of combustion resulting from the incomplete combustion of the natural gas gradually accummulate in the furnace until the upper part thereof is completely filled with the gases and the liberated carbon in suspension. The main gate 25 in the circuit being open, the products of combustion with the suspended liberated carbon begin to circulate through the cooling system 10 and the blower 22 together with its regulating valve 24 are adjusted to give an exhaust pressure and velocity sufficient to carry the products of combustion together with the suspended carbon through the restricted cooling system and through the filtration bags 16 of the collector. The velocity in the cooling circuit is such that the greater portion of flocculent carbon which is precipitated or becomes deposited upon the inner walls of the cooling circuit is carried along with the main stream of products of combustion into the collector so that the great portion of the liberated carbon which leaves the furnace through the outlet 9 actually reaches the collector and is there filtered out and deposited into the hopper 15, the cleansed gases pass out through a conduit 23 and the blower 22.

I have found that the bag collectors operate very efficiently to filter out the liberated carbon and that they work particularly well at temperatures below 225° F. Efficient results for example have been obtained with the operation of the collector gases at a temperature of 170° F. to 225° F. I have also found that with the proper adjustment of the gas and air supplied to the furnace and with a proper balance of the system including the careful adjustment of the exhaust pressure and the degree of cooling that the carbon black recovered in the hopper 15 is a particularly desirable commercial product and is free from the above noted injurious constituents and undesirable qualities; moreover, the yield of carbon per unit of gas is found to be greater than the yield of carbon produced by many known methods and devices.

These results are noticeable to a certain degree under various conditions of operation, but are particularly marked with temperatures in the furnace running above 1200° F. For example, with temperatures in the furnace of 1400° F. to 1800° F. (as measured by pyrometer 28), and with careful adjustment of the air admitted into the furnace, both the yield and quality of carbon produced are good. A test of the gases near the top of the furnace with one adjustment showed a total absence of free oxygen, a small percentage (1.8%) of carbon monoxide (CO) and a larger percentage (7.7%) of carbon dioxide ($CO_2$). Good results were obtained with adjustments giving other percentages of these gases. It is also observed that with an adjustment such that the products of combustion and intermixed gases are all retained above the level of the burners 2, the yield and quality are good. For example, as indicated in Figure 1, there seems under certain conditions to be a clear and defined dividing line or blanket 29 between the gases 30 above and the air below this line, and the air entering the furnace and collecting beneath this blanket is probably preheated to a certain degree before it enters the combustion and dissociation space. The increased yield of carbon per unit of gas at the higher temperature operation is probably due to the co-operation of all the elements of my process and apparatus, although it may be due in part to some dissociation of the carbon and hydrogen of unburned gas which may reach the high temperature regions of the furnace without being burned by the flame. For instance, a portion only of the dissociated and liberated carbon recovered in the collector may come from the incomplete combustion while the remainder may be due to carbon which is thermally dissociated from unburned gas ($CH_4$ methane and $C_2H_6$ ethane) escaping through the flames into the high temperature regions of the furnace, the liberated hydrogen being burned to water. It is understood, however, that I do not limit my improvements to any particular theory of operation, as it may develop later that the good results obtained are based upon a different theory of operation and reactions taking place.

I have also found that the electrical precipitator cooperates to a particular degree with my other apparatus to produce a large yield of carbon per unit of gas, although I now prefer for certain reasons the bag filtration system.

For the purpose of relieving the furnace 1 of the products of combustion or for other reasons an outlet 26 is provided and is disposed near the top of the furnace, a door 27 being positioned upon the upper end of the pipe 26 for the purpose of opening or closing the same. The heater 11 is in the nature of a steam chamber for preheating the cooled products of combustion before they enter the collectors. This may be desirable in certain cases to raise the temperature of the gases above the dew or vaporization points before they pass through the collectors. By a proper adjustment of the cooling and exhaust system the gases may be expected to lose a portion of the water or vapor content and the elevation of the temperature above the dew point before passage through the collector insures the passage of the greater portion of the water content through the collector and out with the cleansed gases as a water vapor.

In each of the various forms of the invention a substantially uniform mixing of the hydrocarbon and fuel is obtained prior to, or in the early stages, combustion and the partial combustion reaction is carried on under uniform conditions which may be adjusted to suit the characteristics peculiar to any type of hydrocarbons which may be used in the production of the carbons. The disturbing influence of cooling plates, unguarded inflow of air and other influences which might effect the combustion reaction and impair the quality or yield of the carbon are therefore excluded.

In accordance with the requirements of the patent statutes I have set forth only one form of the many forms my invention is capable of assuming. The drawings being purposely diagrammatic for convenience in illustration, and it is understood that the claims annexed hereto are not to be construed as limited to the exact methods and devices illustrated, except as is specifically recited therein, but are to be construed to cover all modifications coming within the spirit of the invention.

Having thus described my invention, what I desire to secure by Letters Patent of the United States and claim is:

1. In an apparatus for separating and recovering carbon black from a hydrocarbon gas, the combination of a furnace; gas burners positioned within said furnace; a gas mixing machine adapted to receive gas and air in proportional quantities insufficient for complete combustion, and to agitate and positively mix the same; and connections between several gas burners and the mixing machine.

2. In an apparatus for separating and recovering carbon black from a hydrocarbon gas, the combination of a furnace and burners within the furnace adapted to receive and partially burn the hydrocarbon gas and means for agitating and positively mixing gas and air and supplying the mixed gas and air to said burners.

3. In an apparatus for separating and recovering carbon black from a hydrocarbon gas, the combination of a number of burners, a device for supplying a mixture of gas and air to such burners, means for regulating the supply of gas and air to said device, means for agitating and mixing the regulated supplies of air and gas, a cooling system for receiving the resulting products of combustion and reducing the temperature thereof, and a collector adapted to receive the cooled products and isolate the liberated carbon.

4. In an apparatus for separating carbon from a hydrocarbon gas, the combination of a furnace of comparatively large dimensions, burners disposed in the lower part of such furnace, means for supplying air and gas to said furnace and for regulating the supply of air and gas, a device for mechanically mixing said regulated supply of air and of gas, and means for conveying said mixed gases to and distributing them to the burners in said furnace, a cooler for receiving the hot products of combustion from the furnace, a collector for isolating the liberated carbon from the cooled product and means for exhausting the products of combustion from the upper part of the furnace through the cooler and collector.

5. In an apparatus for separating and recovering carbon black from a hydrocarbon gas, the combination of a furnace; burners positioned within said furnace; a mixing device for mechanically stirring and mixing said gas and air; control means for admitting gas and air into said mixing device; and a conduit intermediate the burners and the mixing device.

In testimony whereof, I affix my signature.

CHAUNCEY MATLOCK.